(12) United States Patent
Namkoong et al.

(10) Patent No.: US 8,945,484 B2
(45) Date of Patent: Feb. 3, 2015

(54) MICROFLUIDIC DEVICE INCLUDING MICROVALVE

(75) Inventors: Kak Namkoong, Yongin-si (KR);
Joon-ho Kim, Yongin-si (KR);
Won-jong Jung, Yongin-si (KR);
Chin-sung Park, Yongin-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 711 days.

(21) Appl. No.: 13/188,075

(22) Filed: Jul. 21, 2011

(65) Prior Publication Data

US 2012/0039770 A1 Feb. 16, 2012

(30) Foreign Application Priority Data

Aug. 12, 2010 (KR) ........................ 10-2010-0077816

(51) Int. Cl.
*F16K 3/00* (2006.01)
*B01L 3/00* (2006.01)
*F16K 99/00* (2006.01)

(52) U.S. Cl.
CPC ......... *B01L 3/502738* (2013.01); *F16K 37/066* (2013.01); *B01L 2300/0816* (2013.01); *B01L 2300/123* (2013.01); *B01L 2400/0655* (2013.01); *F16K 99/0015* (2013.01); *F16K 99/0057* (2013.01); *F16K 99/0059* (2013.01); *F16K 2099/0084* (2013.01)
USPC ........................................ 422/537

(58) Field of Classification Search
CPC ......... F15C 3/00; F16K 99/0001; F16K 7/07; F16K 1/42; F16K 1/302; F16K 1/36; F16K 3/20; F16K 37/0066
USPC ........................................ 422/537
See application file for complete search history.

(56) References Cited

U.S. PATENT DOCUMENTS

| | | | | |
|---|---|---|---|---|
| 5,676,348 | A | * | 10/1997 | Ungchusri et al. ............ 251/316 |
| 6,131,879 | A | * | 10/2000 | Kluge et al. ............ 251/129.06 |
| 6,767,194 | B2 | | 7/2004 | Jeon et al. |
| 6,981,518 | B2 | * | 1/2006 | Gilbert et al. ............ 137/599.07 |
| 7,217,395 | B2 | | 5/2007 | Sander |
| 7,392,827 | B2 | | 7/2008 | Fernandes et al. |

(Continued)

FOREIGN PATENT DOCUMENTS

| | | |
|---|---|---|
| KR | 100727533 B1 | 6/2007 |
| WO | 2007/029132 A2 | 3/2007 |

(Continued)

OTHER PUBLICATIONS

Kim, et al., A three-dimensionally silicon-micromachined fluidic amplifier device, J. Micomech. Microeng. 8 (1998) 7-14.

(Continued)

*Primary Examiner* — Lore Jarrett
(74) *Attorney, Agent, or Firm* — Leydig, Voit & Mayer, Ltd.

(57) ABSTRACT

A microfluidic device including at least one microvalve which controls a flow of a fluid, where the at least one microvalve includes: a pneumatic layer, a fluidic layer disposed opposite to the pneumatic layer; an elastomer membrane disposed between the pneumatic layer and the fluidic layer; and an asymmetric valve seat protruding from a surface of the fluidic layer toward a surface of the elastomer membrane and asymmetrically dividing a space between the fluidic layer and the elastomer membrane.

31 Claims, 16 Drawing Sheets

(56) References Cited

U.S. PATENT DOCUMENTS

| | | | |
|---|---|---|---|
| 7,445,926 B2 | 11/2008 | Mathies et al. | |
| 7,607,641 B1 | 10/2009 | Yuan | |
| 2002/0029814 A1* | 3/2002 | Unger et al. | 137/824 |
| 2007/0237686 A1* | 10/2007 | Mathies et al. | 422/103 |
| 2009/0051716 A1* | 2/2009 | Beebe et al. | 347/9 |

FOREIGN PATENT DOCUMENTS

| | | | | |
|---|---|---|---|---|
| WO | 2007/029133 A2 | 3/2007 | | |
| WO | WO2008115626 A2 * | 9/2008 | | C12M 3/00 |

OTHER PUBLICATIONS

Leslie, et al., Frequency-specific flow control in microfluidic circuits with passive elastomeric features, Nature Physics, vol. 5 Mar. 2009 pp. 231-235.

Mosadegh, et al., Integrated elastomeric components for autonmous regulation of sequential and oscillatory flow switching in microfluidic devices, Nature Physics Advanced Online Publication Apr. 18, 2010 pp. 1-5.

* cited by examiner

Valve closing condition : $\delta(x) < 0$ at $x = rL$ $$\delta(rL) = \frac{r^2(1-r)^2 L^4}{2Et^3}[r^2(3-2r)P_{fluid} - P_{air}] < 0 \implies P_{air} > r^2(3-2r)P_{fluid}$$

Valve closing condition: $P_{air} > 0.5\, P_{fluid}$ for $= 0.5$

| r | $P_{air} / P_{fluid}$ |
|---|---|
| 0.2 | 0.1 |
| 0.5 | 0.5 |
| 0.8 | 0.9 |
| 1.0 | 1.0 |

<Fluidic AND gate>    <NMOS AND gate>

<Fluidic NAND gate>    <NMOS NAND gate>

US 8,945,484 B2

MICROFLUIDIC DEVICE INCLUDING MICROVALVE

CROSS-REFERENCE TO RELATED APPLICATIONS

This application claims priority to Korean Patent Application No. 10-2010-0077816, filed on Aug. 12, 2010, and all the benefits accruing therefrom under 35 U.S.C. §119, the content of which in its entirety is herein incorporated by reference.

BACKGROUND

1. Field

Embodiments of the present disclosure relate to a microfluidic device including a microvalve, and more particularly, to a microfluidic device including a microvalve including an asymmetric valve seat, and a microfluidic device including a microfluidic circuit including logic gates implemented by microvalves.

2. Description of the Related Art

Research into microfluidic devices, which perform various functions for biochemical reactions using biochemical fluids, such as blood, urine, saliva and sputum, for example, and detect the results thereof, has been actively performed in microfluidics. Microfluidic devices may be of a chip type such as a lab-on-a-chip or of disk type such as a lab-on-a-disk. The lab-on-a-chip and lab-on-a-disk have received much attention in chemical and biotechnology fields since such devices may increase the reaction rates, be automated, be made portable, and use a small amount of reagent. A microfluidic device typically includes a microchannel, through which a fluid flows, and a microvalve, which controls the flow of fluid in the microchannel. In a microfluidic device, the microvalve controls the transfer, mixing, accurate metering, biochemical reaction, isolation and detection of a sample in the microfluidic device of a chip type such as a lab-on-a-chip.

SUMMARY

Provided is a microfluidic device including a microvalve.

Additional aspects will be set forth in part in the description which follows and, in part, will be apparent from the description, or may be learned by practice of the embodiments described herein.

According to an embodiment of the present disclosure, a microfluidic device includes at least one microvalve which controls a flow of a fluid, where the at least one microvalve includes: a pneumatic layer, a fluidic layer disposed opposite to the pneumatic layer; an elastomer membrane disposed between the pneumatic layer and the fluidic layer, where the elastomer membrane is deformed by a pressure applied thereto; and an asymmetric valve seat protruding from a surface of the fluidic layer toward a surface of the elastomer membrane and asymmetrically dividing a first space between the fluidic layer and the elastomer membrane.

According to an alternative embodiment of the present disclosure, a microfluidic device includes at least one microvalve which controls a flow of a fluid, where the at least one microvalve includes: a fluidic layer which defines a first path, through which the fluid flows into the at least one microvalve; a pneumatic layer disposed opposite to the fluidic layer and which defines a second path, through which gas flows into the at least one microvalve; an asymmetric valve seat protruding from a surface of the fluidic layer; an elastomer membrane which is disposed between the fluidic layer and the pneumatic layer and deformed by a pressure to substantially contact or to be spaced apart from the asymmetric valve seat, and thus controls the flow of the fluid; and a first space between the fluidic layer and the elastomer membrane, where the first space is asymmetrically divided by the asymmetric valve seat.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
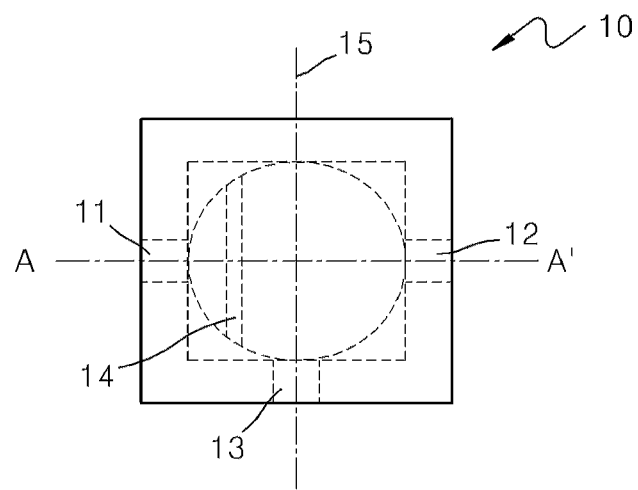
FIG. 1A is a plan view of an embodiment of a microvalve disposed in a microfluidic device according to the present disclosure.

Reference will now be made in detail to embodiments, examples of which are illustrated in the accompanying drawings, wherein like reference numerals refer to the like elements throughout. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In this regard, the present embodiments may have different forms and should not be construed as being limited to the descriptions set forth herein. Accordingly, the embodiments are merely described below, by referring to the figures, to explain aspects of the present description.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically, fluidly and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "upper" or "above" relative to the other elements or features. Thus, the exemplary term "lower" and "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In the description, to prevent the subject matter of the embodiments of the disclosure from being obscured, only a limited number of configurations, such as a microvalve and a microchannel of a microfluidic device, will be described. However, it will be obvious to one of ordinary skill in the art that other general-use structures may be added to the microfluidic device in addition to the configurations.

An analysis of samples related to medical or environmental matters is typically achieved through a biochemical, chemical or mechanical treatment process. Recently, a microfluidic device to simply and precisely analyze a sample has been widely used for diagnosing or monitoring a biological sample. The microfluidic device includes a plurality of microvalves, a sample inlet, a sample outlet, microchannels and reaction chambers, which are formed on a thin substrate and used as platforms for amplifying/diagnosing a bio-sample and developing new medicine.

The microfluidic device may further include microvalves and micropumps such that a sample and reagent may be accurately supplied to target positions in the microfluidic device. The microvalves are typically disposed between microchannels in the microfluidic device to control a flow of a sample between the microchannels.

In an embodiment, a microvalve may be defined by a pneumatic layer and a fluidic layer, which are disposed opposite to each other, an elastomer membrane, which is disposed between the pneumatic layer and the fluidic layer and deformed by a pressure to control a flow of fluid, and a valve seat, which protrudes from the surface of the fluidic layer toward the surface of the elastomer membrane. In such an embodiment, the microvalve is closed when the elastomer membrane contacts the valve seat, such that the fluid is blocked not to pass through the microvalve. In such an embodiment, when the elastomer membrane is separated from the valve seat, the microvalve is opened, such that the fluid is allowed to pass through the microvalve.

In such an embodiment, even though not shown herein, the fluidic layer may have a path, through which the fluid flows into the microvalve, and the pneumatic layer may have a path, through which air flows into or flows out of the microvalve, such that air may flow into the microvalve at a positive pressure and flow out of the microvalve at a negative pressure. The elastomer membrane may include, for example, a polymer such as polydimethylsiloxane ("PDMS"), and the pneumatic layer and the fluidic layer may include, for example, a transparent material such as glass or plastic.

An embodiment of the microvalve includes the valve seat disposed between the fluidic layer and the elastomer membrane, and a space between the fluidic layer and the elastomer membrane is generally divided symmetrically with respect to the valve seat. In an embodiment, when the valve seat is asymmetrically aligned in the microvalve, conditions for opening and closing the valve may vary. In one embodiment, for example, the microvalve may be closed by a pneumatic pressure less than a pneumatic pressure used in the symmetric alignment or may be opened by a fluidic pressure less than a fluidic pressure used in the symmetric alignment. Hereinafter, a microvalve including an asymmetric valve seat will be described in greater detail.

FIG. 1A is a plan view of an embodiment of a microvalve disposed in a microfluidic device according to the present disclosure. In FIG. 1A, the configuration of an embodiment of the microvalve 10 is shown in broken lines.

An asymmetric valve seat 14 is disposed across a fluid inlet 11 and a fluid outlet 12 in the microvalve 10 asymmetrically dividing a space between the fluid inlet 11 and the fluid outlet 12. In an embodiment, the asymmetric valve seat 14 may be disposed closer to the fluid inlet 11 than the fluid outlet 12, as shown in FIG. 1A. However, in an alternative embodiment, the asymmetric valve seat 14 may be disposed closer to the fluid outlet 12 than the fluid inlet 11. In such an embodiment, the asymmetric valve seat 14 is not symmetrically disposed in the microvalve, e.g., the valve seat is disposed along a symmetric imaginary reference line 15 shown in FIG. 1A, but asymmetrically disposed in the microvalve 10, e.g., disposed asymmetrically dividing a space, in which the valve seat is disposed. The alignment of the asymmetric valve seat 14 will be described later.

Even though not shown in FIG. 1A, in an embodiment of the microvalve 10, the fluidic layer and the elastomer membrane are disposed opposite to, e.g., facing, each other and spaced apart from each other by a first space, e.g., a space connected to the fluid inlet 11 and the fluid outlet 12, through which the fluid flows in and out of the space. In such an embodiment, the pneumatic layer and the elastomer membrane are disposed opposite to each other and spaced apart from each other by a second space, e.g., a space connected to an air path 13 through which air flows in or out of the space. The configuration not shown in FIG. 1A will be understood by referring to FIGS. 2 and 3, which are vertical cross-sectional views taken along line A-A' of the microvalve 10 in FIG. 1A.

Figure 1B:
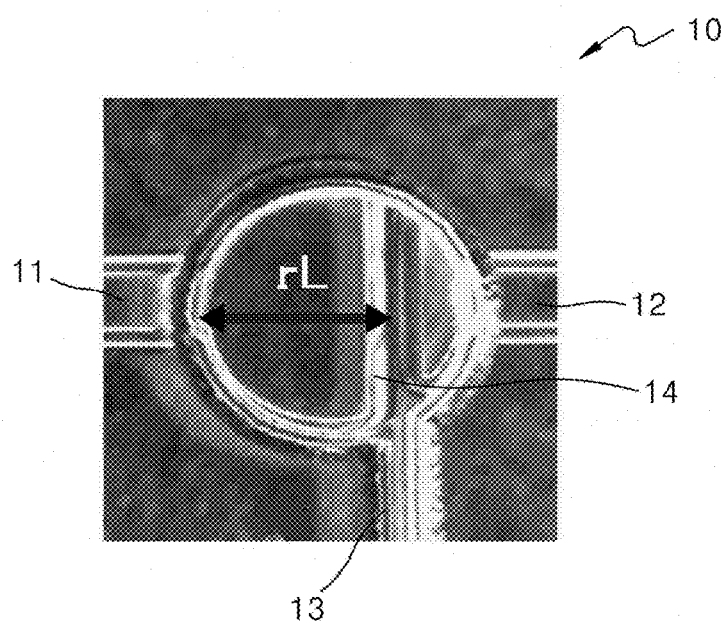
FIG. 1B is a microscopic image of an embodiment of a microvalve according to the present disclosure.

FIG. 1B is a microscopic image of an embodiment of a microvalve according to the present disclosure. Referring to FIG. 1B, the microvalve 10 includes the fluid inlet 11, the fluid outlet 12 and the air path 13, as shown in FIG. 1A. In such an embodiment, the asymmetric valve seat 14 is asymmetrically disposed closer to the fluid outlet 12.

Figure 2A:
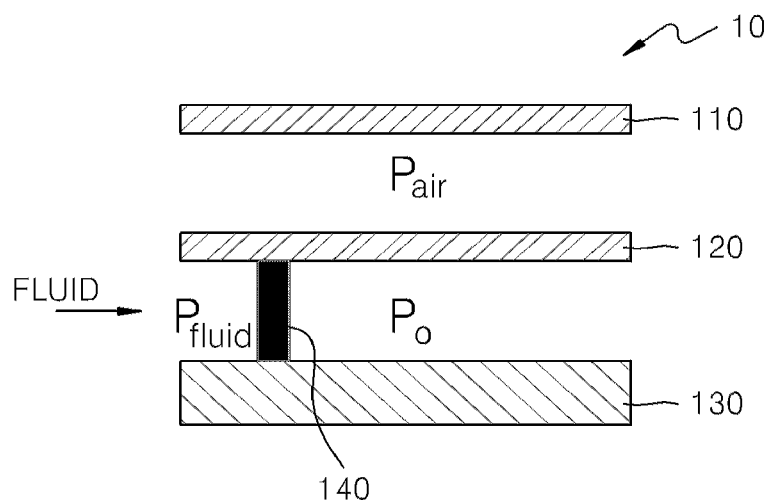
FIGS. 2A and 2B are cross-sectional views taken along line A-A' of a microvalve in FIG. 1A.
Figure 2B:
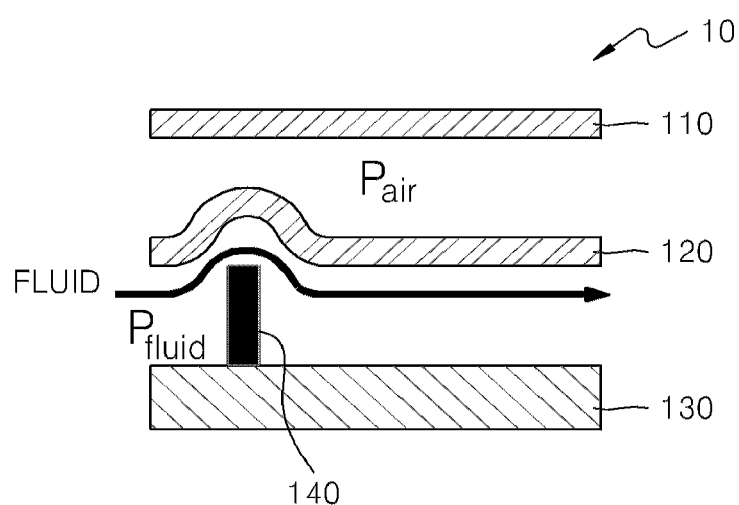

FIGS. 2A and 2B are cross-sectional views of a region of a microvalve according to an embodiment of the present disclosure. FIGS. 2A and 2B are cross-sectional views taken along line A-A' of the microvalve in FIG. 1A. Referring to FIGS. 2A and 2B, an asymmetric valve seat 140 protrudes from a surface, e.g., a top surface, of a fluidic layer 130 at a position closer to a fluid inlet than a fluid outlet.

A microvalve 10 includes a pneumatic layer 110, an elastomer membrane 120, a fluidic layer 130 and an asymmetric valve seat 140. In an embodiment, the microvalve 10 further includes spaces therein, e.g., the second space between the pneumatic layer 110 and the elastomer membrane 120 and the first space between the elastomer membrane 120 and the fluidic layer 130. When air flows into or flows out of the second space between the pneumatic layer 110 and the elastomer membrane 120, a pneumatic pressure ($P_{air}$) is applied to the elastomer membrane 120. The first space between the elastomer membrane 120 and the fluidic layer 130 is divided into two sub-spaces, e.g., a first sub-space and a second sub-space, by the asymmetric valve seat 140, and fluid flows into the first sub-space. Thus, a fluidic pressure ($P_{fluid}$) is applied to the elastomer membrane 120. Accordingly, when a force applied to the elastomer membrane 120 by the fluid filled in the first sub-space between the elastomer membrane 120 and the fluidic layer 130 is in equilibrium with a force applied to the elastomer membrane 120 by the air filled in the second space between the pneumatic layer 110 and the elastomer membrane 120, the closed microvalve 10 is maintained in equilibrium.

FIG. 2A shows a cross-sectional view of a closed microvalve 10 when the fluid or air does not flow into the microvalve 10, or the pneumatic pressure ($P_{air}$) and the fluidic pressure ($P_{fluid}$) are in equilibrium such that the elastomer membrane 120 is substantially in contact with the asymmetric valve seat 140.

In an embodiment, since the asymmetric valve seat 140 is disposed closer to the fluid inlet than the fluid outlet as shown in FIG. 2A, the pneumatic pressure ($P_{air}$) to be in equilibrium with the fluidic pressure ($P_{fluid}$) is less than the pneumatic pressure to be in equilibrium with the same fluidic pressure when a symmetric valve seat is included, e.g., in case where the valve seat is disposed at the center position between the fluid inlet and the fluid outlet, because the area of the elastomer membrane 120, to which the fluidic pressure ($P_{fluid}$) is applied, is reduced. Accordingly, an embodiment of the microvalve 10 in FIG. 2A may be closed with a relatively low pneumatic pressure ($P_{air}$).

FIG. 2B is a cross-sectional view of an opened microvalve 10 when fluid flows in the microvalve 10. When the ratio of the fluidic pressure ($P_{fluid}$) to the pneumatic pressure ($P_{air}$) is greater than a reference value, the elastomer membrane 120 is deformed to be spaced apart from the asymmetric valve seat 140, and thus fluid flows through the asymmetric valve seat 140 toward the fluid outlet. In an embodiment, the reference value may vary base on the position of the microvalve seat and the structure and materials of the microvalve, for example.

Figure 2C:
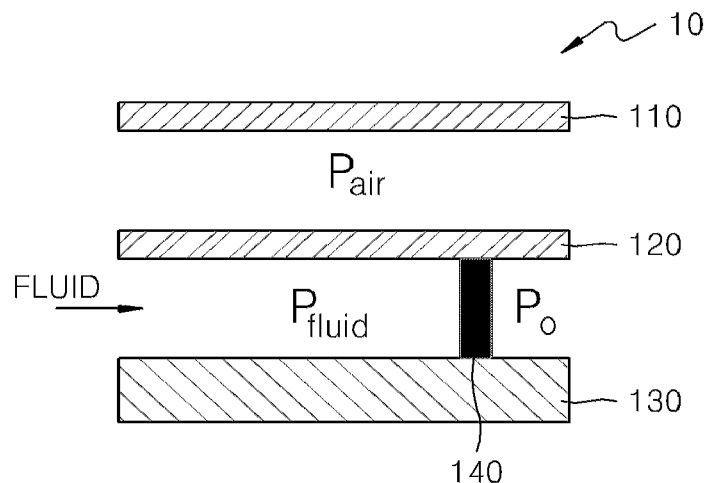
FIGS. 2C and 2D are cross-sectional views of an alternative embodiment of a microvalve according to the present disclosure.
Figure 2D:
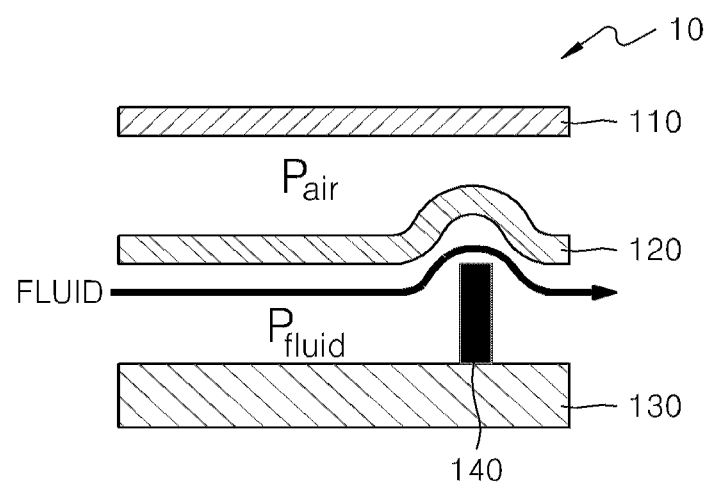

FIGS. 2C and 2D are cross-sectional views of an alternative embodiment of a microvalve according to the present disclosure. FIGS. 2C and 2D are cross-sectional views taken along line A-A' in FIG. 1A when the asymmetric valve seat 140 is disposed closer to the fluid outlet than the fluid inlet. In FIGS. 2C and 2D, an embodiment of the microvalve 10 has substantially the same structure as the embodiment of the microvalve 10 shown in FIGS. 2A and 2B, except that at position of the asymmetric valve seat 140 on the surface of the fluidic layer 130, e.g., the asymmetric valve seat 140 is disposed closer to the fluid outlet than the fluid inlet such that the size of the first sub-space, in which the fluid is filled and the fluidic pressure ($P_{fluid}$) is applied, is increased by aligning the asymmetric valve seat 140.

FIG. 2C shows a cross-sectional view of a closed microvalve 10 when the fluid or air does not flow into the microvalve 10, or the pneumatic pressure ($P_{air}$) and the fluidic pressure ($P_{fluid}$) are in equilibrium such that the elastomer membrane 120 is substantially in contact with the asymmetric valve seat 140.

In an embodiment shown in FIG. 2C, since the asymmetric valve seat 140 is disposed closer to the fluid outlet, the pneumatic pressure ($P_{air}$) to be in the equilibrium with the fluidic pressure ($P_{fluid}$) is greater than the pneumatic pressure ($P_{air}$) to be in the equilibrium with the same fluidic pressure ($P_{fluid}$) when a symmetric valve seat is included because the area of the elastomer membrane 120 to which the fluidic pressure ($P_{fluid}$) is applied is increased. Accordingly, an embodiment of the microvalve 10 of FIG. 2C may be opened with a relatively low fluidic pressure ($P_{fluid}$).

FIG. 2D is a cross-sectional view of an open microvalve 10 when fluid flows into the microvalve 10. When the ratio of the fluidic pressure ($P_{fluid}$) to the pneumatic pressure ($P_{air}$) is greater than a reference value, the elastomer membrane 120 is deformed to be spaced apart from the asymmetric valve seat 140, and thus fluid flows through the asymmetric valve seat 140 toward the fluid outlet.

FIGS. 3A to 3D show a process of determining the relationship between a position of a valve seat and a pressure ratio ($P_{air}/P_{fluid}$) at which an elastomer membrane is deformed to close the microvalve in a one-dimensional model of the structure of a microvalve.

Figure 3A:
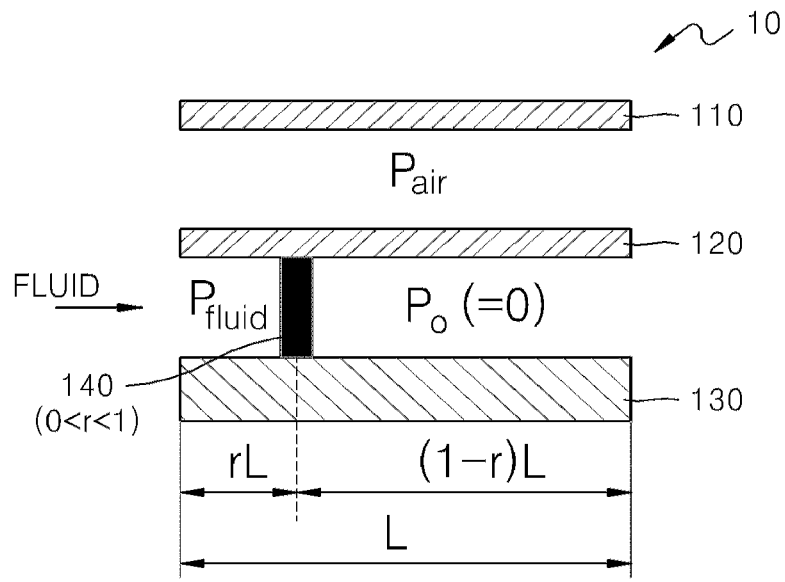
FIGS. 3A to 3D show a process of determining the relationship between a position of a valve seat and a pressure ratio ($P_{air}/P_{fluid}$) when an elastomer membrane is deformed using a one-dimensional model of the structure of a microvalve.

Referring to FIG. 3A, which is a cross-sectional view taken along line A-A' of FIG. 1A, the length from the fluid inlet to the fluid outlet is denoted as L, the length from the fluid inlet to the valve seat is denoted as rL, and the length from the valve seat to the fluid outlet is denoted as (1−r)L. In this regard, if a symmetric valve seat is used, r=0.5.

Figure 3B:
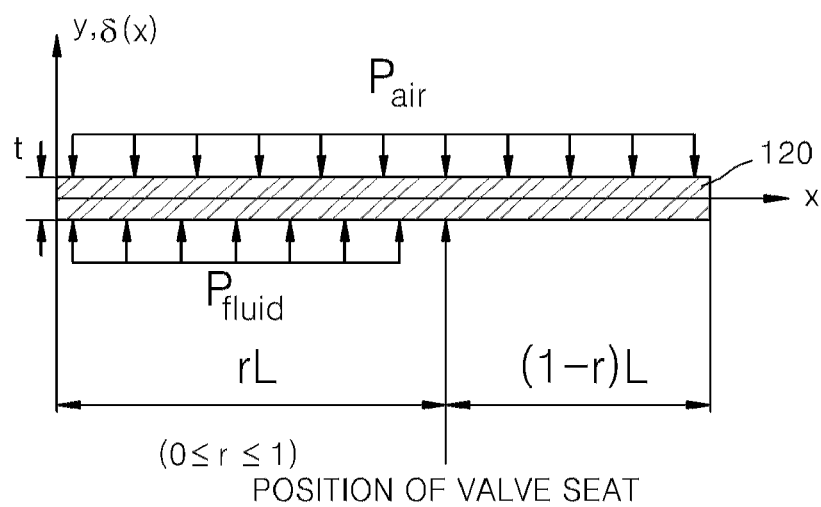

In FIG. 3B, the length from the elastomer membrane 120 to the valve seat is shown and the elastomer membrane 120 is shown as a one-dimensional Eluer beam along the X-axis. The pneumatic pressure ($P_{air}$) is applied to one surface, e.g., an upper surface, of the elastomer membrane 120, and the fluidic pressure ($P_{fluid}$) is applied to a portion of the other surface, e.g., lower surface, of the elastomer membrane 120 by the length rL.

Figure 3C:
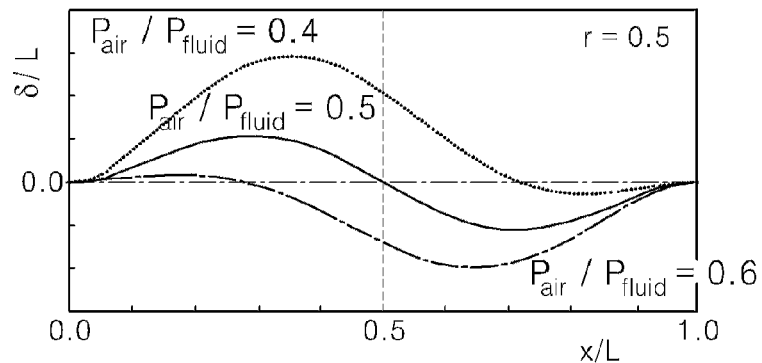

FIG. 3C shows the model of a one-dimensional Euler beam designed using Equation 1 in the case of the elastomer membrane 120 of FIG. 3B. If the valve is closed when δ(x)<0 (x=rL), a relationship between the pneumatic pressure ($P_{air}$) and the fluidic pressure ($P_{fluid}$) is calculated according to Equation 1 below.

$$\delta(rL) = \frac{r^2(1-r)^2 L^4}{2Et^3}[r^2(3-2r)P_{fluid} - P_{air}] < 0 \quad \text{Equation 1}$$

$$\Rightarrow P_{air} > r^2(3-2r)P_{fluid}$$

Referring to Equation 1, the relationship between the pneumatic pressure ($P_{air}$) and the fluidic pressure ($P_{fluid}$) may be shown by an inequality, $P_{air}/P_{fluid} > r^2(3-2r)$. Accordingly, as shown in FIG. 3C, if $P_{air}/P_{fluid}=0.4$, an upper portion of the elastomer membrane 120 is deformed to open the microvalve 10. If $P_{air}/P_{fluid}=0.5$, the pneumatic pressure ($P_{air}$) and the fluidic pressure ($P_{fluid}$) are in equilibrium, and the microvalve 10 is thereby closed. If $P_{air}/P_{fluid}=0.6$, a lower portion of the elastomer membrane 120 is substantially deformed to close the microvalve 10.

Figure 3D:
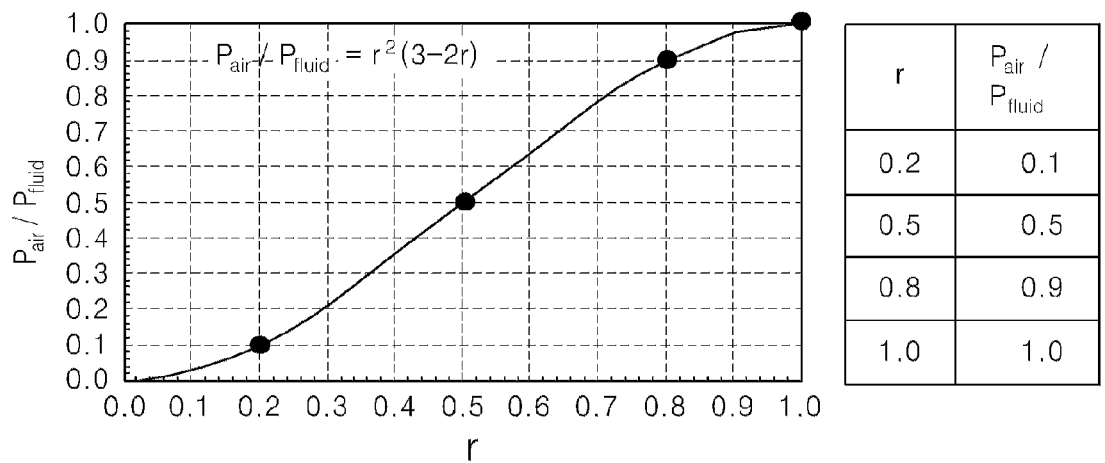

FIG. 3D is a graph illustrating $P_{air}/P_{fluid}$ ratio changes according to the position of the valve seat r. Referring to the graph of FIG. 3D, as the position of the valve seat r approaches 0, that is, if the valve seat is disposed closer to the fluid inlet, the microvalve 10 may be closed by a relatively less pneumatic pressure ($P_{air}$). On the other hand, as the position of the valve seat r approaches 1, that is, the valve seat is disposed closer to the fluid outlet, the microvalve 10 may be opened by a relatively less fluidic pressure ($P_{fluid}$).

As described above, the pressure ratio $P_{air}/P_{fluid}$ for closing the microvalve is related to the position of the valve seat r as shown in a one-dimensional microvalve model in FIGS. 3A to 3D. However, the relationship described above may not be quantitatively applicable to an embodiment of the microvalve having a three-dimensional structure according to the present disclosure, even though a relationship between the pressure ratio $P_{air}/P_{fluid}$ for closing the microvalve and the position of the valve seat r may be generally shown in the one-dimensional microvalve model.

FIGS. 4A, 4B-1, 4B-2 and 4B-3 show results when a three-dimensional modeling is used for an elastomer membrane deformed by a pneumatic pressure ($P_{air}$) and a fluidic pressure ($P_{fluid}$) in an embodiment of a microvalve including a valve seat according to the present disclosure.

Figure 4A:
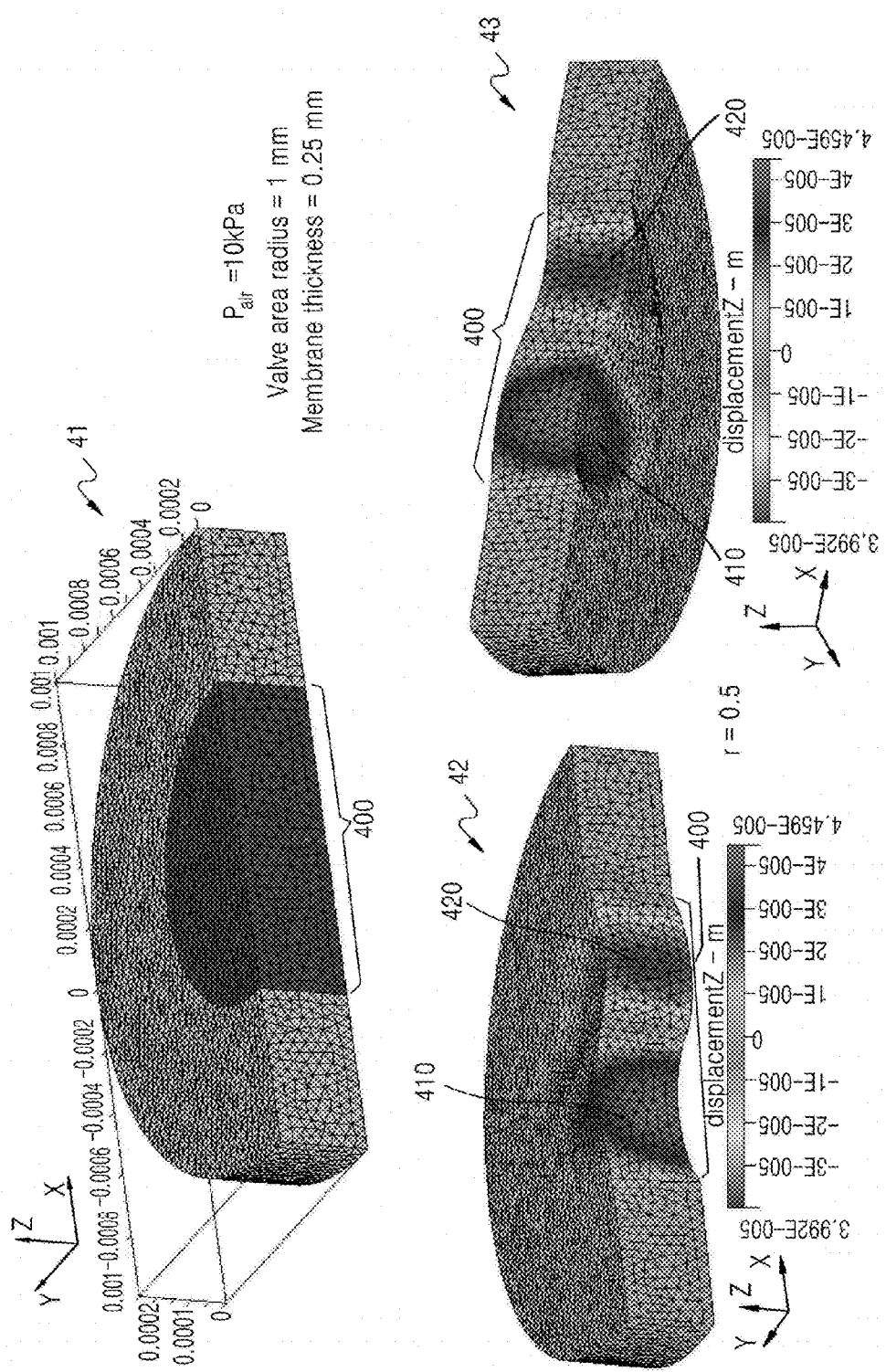
FIGS. 4A, 4B-1, 4B-2 and 4B-3 show results regarding a three-dimensional model of an elastomer membrane deformed by a pneumatic pressure ($P_{air}$) and a fluidic pressure ($P_{fluid}$) in an embodiment of a microvalve including a valve seat according to the present disclosure.
Figures 1, 4B:
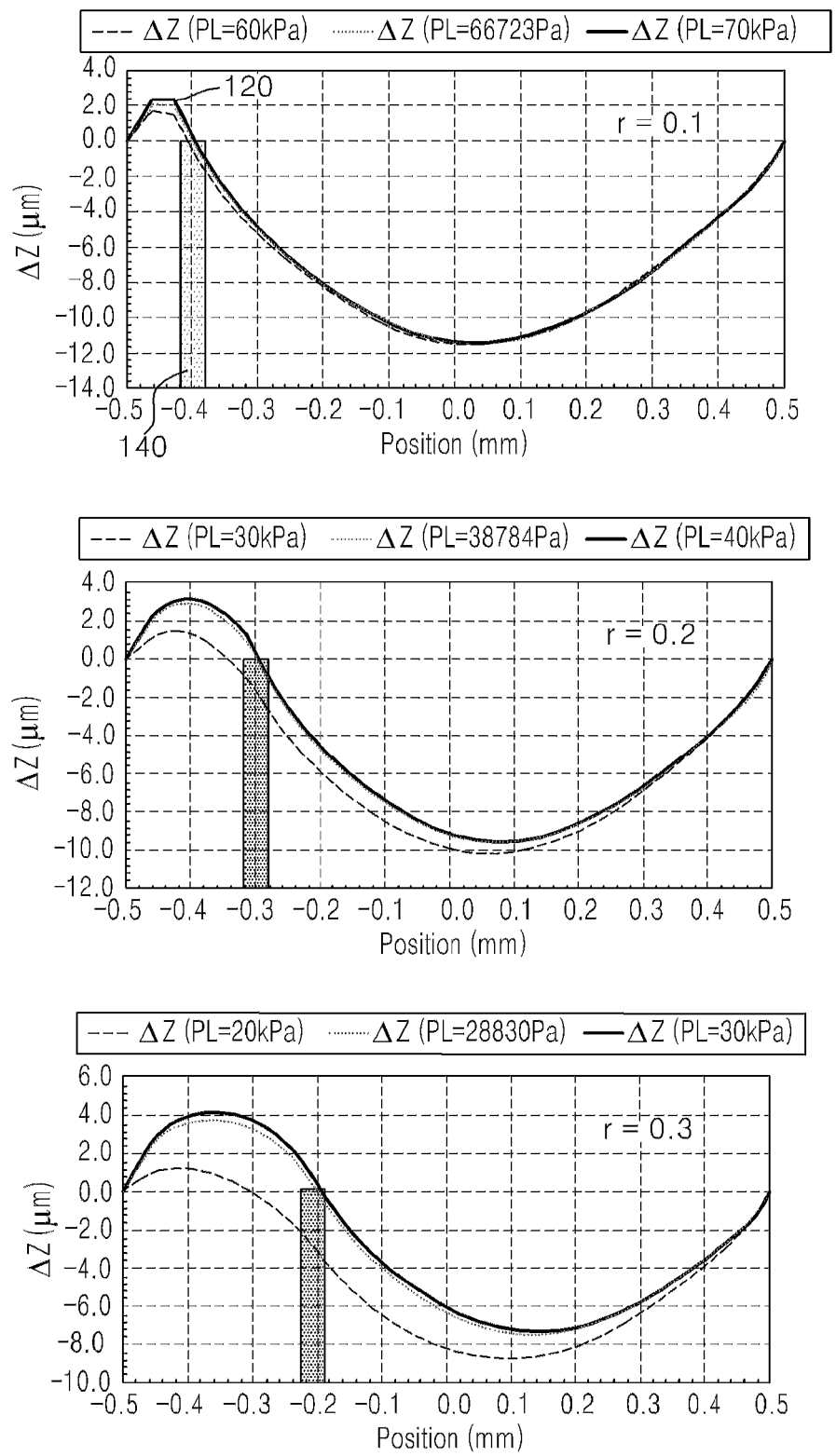
Figures 2, 4B:
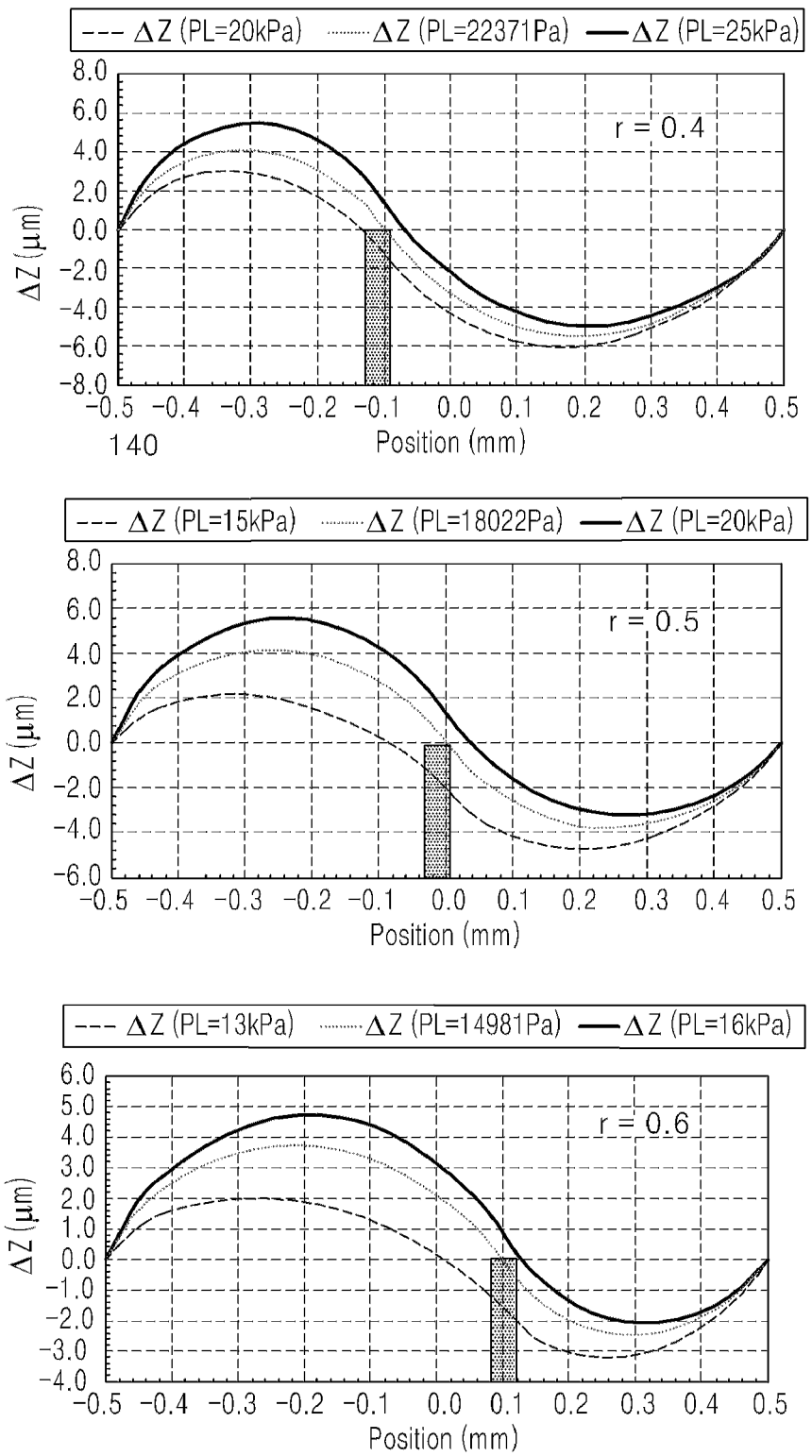
Figures 3, 4B:
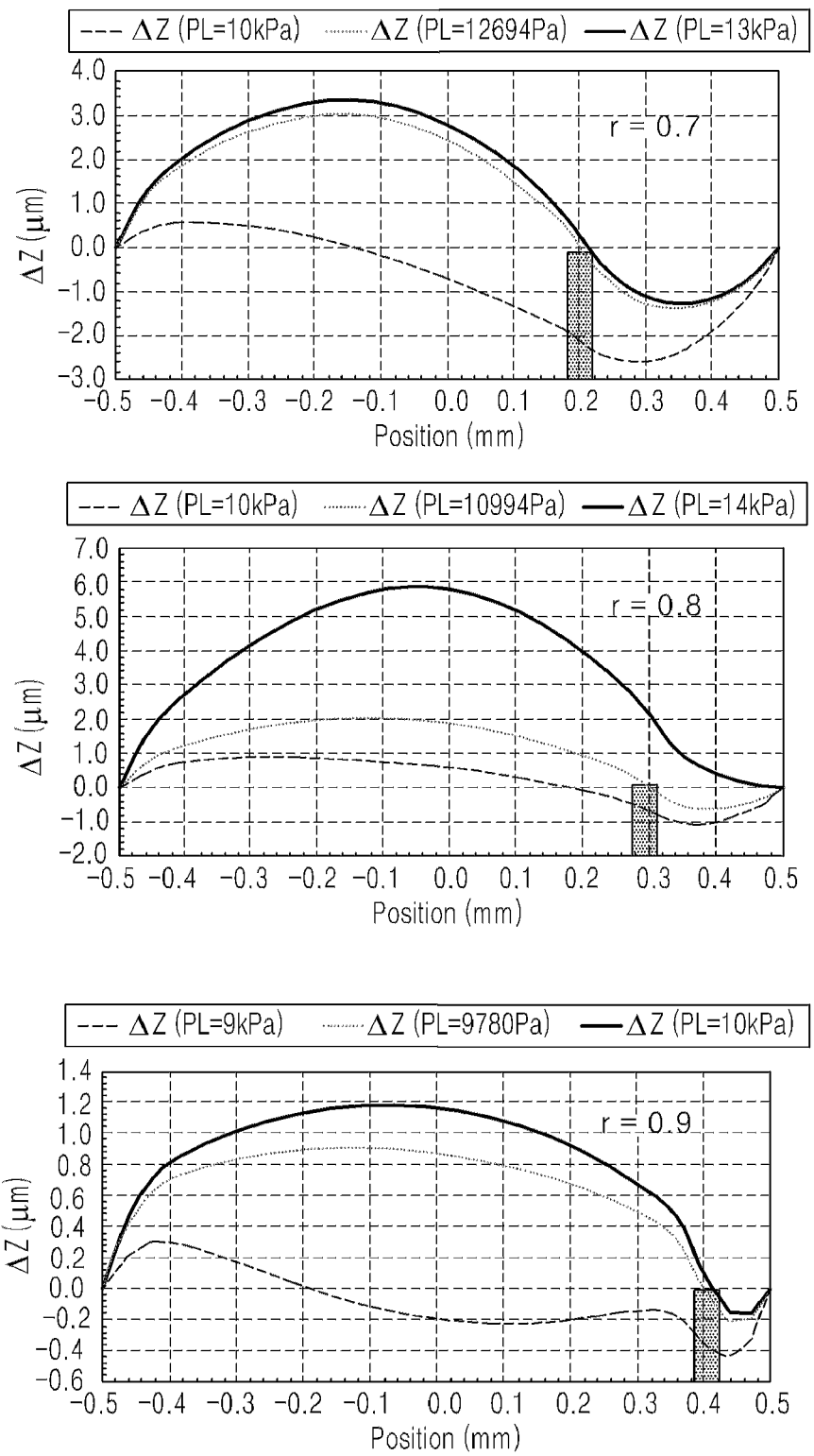

FIG. 4A illustrates half of an embodiment of a microvalve including a symmetric valve seat in a three-dimensional model 41. In FIG. 4A, an inner semicircle is a part of elastomer membrane that the pneumatic pressure is applied (400). FIG. 4A also illustrates a top surface of the microvalve including the elastomer membrane 400 deformed by a pneumatic pressure ($P_{air}$) and a fluidic pressure ($P_{fluid}$) in a three-dimensional model 42. In the three-dimensional model 42, the elastomer membrane 400 protrudes upward (410) in the left-hand side of the valve seat and is recessed downward (420) in the right-hand side of the valve seat. FIG. 4A also illustrates a bottom surface of the elastomer membrane 400 deformed by a pneumatic pressure ($P_{air}$) and a fluidic pressure ($P_{fluid}$) in a three-dimensional model 43.

FIGS. 4B-1, 4B-2 and 4B-3 shows graphs illustrating the relationship between the position of the valve seat 140 r and displacement ΔZ (120) of the elastomer membrane, which are obtained using a three-dimensional model, e.g., the three-dimensional models 41, 42 and 43, shown in FIG. 4A. Even though the relationship between the position of the valve seat 140 r and displacement ΔZ (120) of the elastomer membrane shown in FIGS. 4B-1, 4B-2 and 4B-3 is not substantially identical to the results of the one-dimensional model shown in FIG. 3C, the relationship between the pneumatic pressure ($P_{air}$) and the fluidic pressure ($P_{fluid}$) according to the position of the valve seat 140 r is substantially similar to the relationship shown in FIG. 3C.

In particular, comparing the graph when r=0.1 which indicates that the valve seat 140 is closer to the fluid inlet with the graph when r=0.5 which indicates that the valve seat 140 is symmetrically disposed, the ratio of the fluidic pressure ($P_{fluid}$) to the pneumatic pressure ($P_{air}$) when r=0.1 is greater than the ratio of the fluidic pressure ($P_{fluid}$) to the pneumatic pressure ($P_{air}$) when r=0.5 to open the microvalve. Thus, the ratio of the pneumatic pressure ($P_{air}$) to the fluidic pressure ($P_{fluid}$) when r=0.1 is less than the ratio of the pneumatic pressure ($P_{air}$) to the fluidic pressure ($P_{fluid}$) when r=0.5 to close the microvalve.

Thus, referring to FIGS. 4A, 4B-1, 4B-2 and 4B-3, conditions for the pneumatic pressure ($P_{air}$) and the fluidic pressure ($P_{fluid}$) for opening and closing the microvalve may be effectively controlled by controlling the position of the valve seat in the microvalve, e.g., by asymmetrically disposing the valve seat in the microvalve.

Figure 5A:
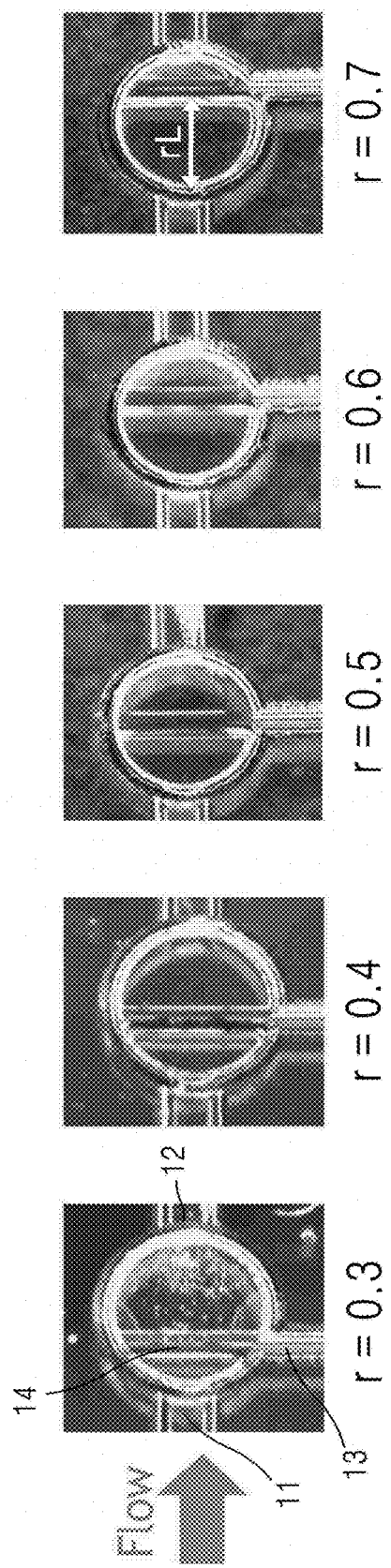
FIG. 5A is microscopic images of embodiments of microvalves including valve seats disposed in various positions therein.
Figure 5B:
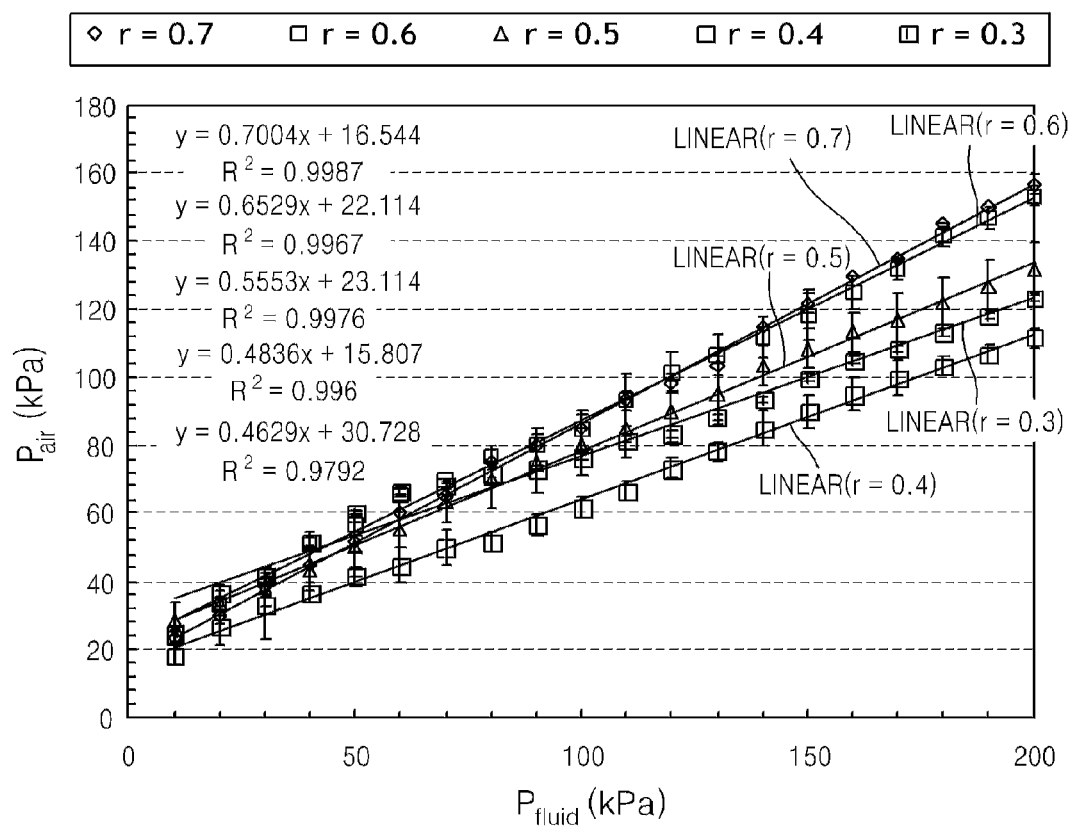
FIG. 5B is a graph illustrating a linear relationship between a pneumatic pressure ($P_{air}$) and a fluidic pressure ($P_{fluid}$) according to the position of the valve seat when the microvalves of FIG. 5A are closed.

FIG. 5A shows microscopic images of embodiments of a microvalve including valve seat disposed in various positions therein according to the present disclosure. FIG. 5B is a graph illustrating a relationship between a pneumatic pressure ($P_{air}$) and a fluidic pressure ($P_{fluid}$) according to the position of the valve seat when the microvalves of FIG. 5A are closed.

Referring to the graph of FIG. 5B, the slope of the pneumatic pressure ($P_{air}$) with respect to the fluidic pressure ($P_{fluid}$) varies according to the position of the valve seat, as shown in FIG. 5A.

As described above, conditions of the pneumatic pressure ($P_{air}$) and the fluidic pressure ($P_{fluid}$) for opening and closing the microvalve vary by the position the valve seat, which may be disposed in the microvalve dividing the first space asymmetrically. Accordingly, the microvalve may be closed by a lower pneumatic pressure ($P_{air}$) if the asymmetric valve seat is disposed closer to the fluid inlet. In addition, the pneumatic pressure ($P_{air}$) for closing the microvalve may be adjusted by controlling the position of the asymmetric valve seat in the microvalve.

An embodiment of the microfluidic device may include a plurality of microvalves described above. In an embodiment of the microfluidic device, the plurality of microvalves includes a first microvalve and a second microvalve, and a position of the asymmetric valve seat in the first microvalve is different from a position of the asymmetric valve seat in the second microvalve. In such an embodiment, the microvalves may be opened and closed with different pneumatic pressures ($P_{air}$) and different fluidic pressures ($P_{fluid}$). Accordingly, an embodiment of the microfluidic device may include a microfluidic circuit, which controls the flow of a plurality of fluids, implemented by the plurality of microvalves.

In an embodiment, a fluidic transistor that switches the flow of the fluid according to the pneumatic pressure ($P_{air}$) may be implemented by the microvalve. In alternative embodiments, logic gates such as a fluidic inverter (fluidic NOT gate), a fluidic OR gate, and a fluidic AND gate may be implemented by at least one fluidic transistor. In such an embodiment, the microfluidic device may include a microfluidic circuit implemented by the fluidic transistors and the fluidic logic gates.

Figure 6:
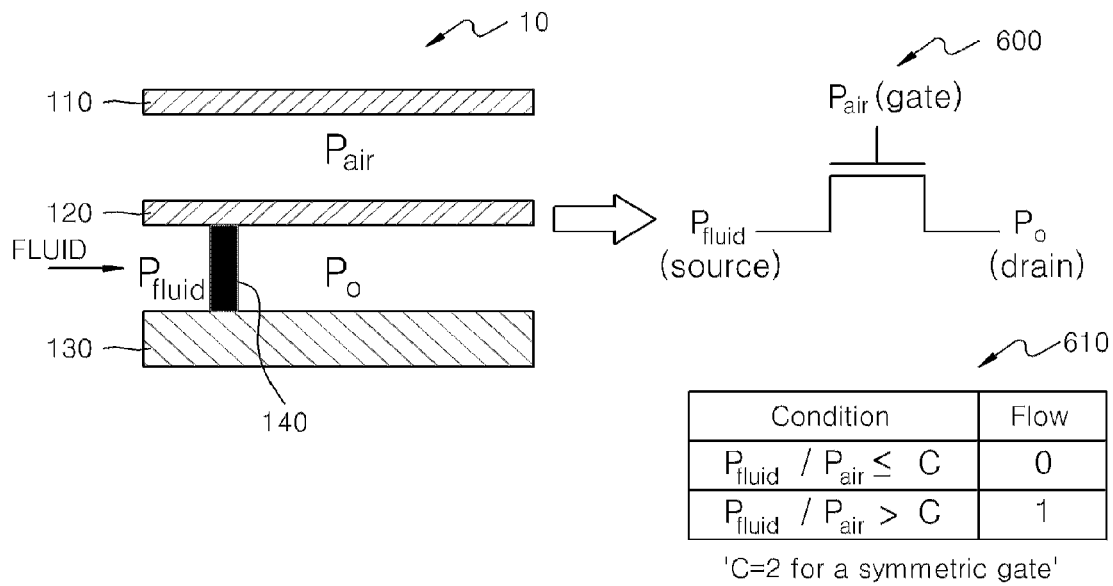
FIG. 6 shows embodiments of a microvalve and a fluidic transistor corresponding to the microvalve according to the present disclosure.

FIG. 6 shows an embodiment of a microvalve and a fluidic transistor corresponding to the embodiment of a microvalve according to the present disclosure. FIG. 6 illustrates a microvalve 10, a fluidic transistor 600 and operating conditions 610 of the fluidic transistor 600.

As described above, the microvalve 10 includes a pneumatic layer 110, an elastomer membrane 120, a fluidic layer 130 and an asymmetric valve seat 140, in which the asymmetric valve seat 140 is asymmetrically disposed, e.g., disposed between the elastomer membrane 120 and the fluidic layer 130 dividing the first space between the elastomer membrane 120 and the fluidic layer 130 asymmetrically.

In an embodiment, the microvalve 10 operates to switch the flow of the fluid in the first space between the elastomer membrane 120 and the fluidic layer 130 based on the pneumatic pressure ($P_{air}$) in the second space between the pneumatic layer 110 and the elastomer membrane 120. In such an embodiment, the microvalve 10 operates in a similar manner to a general metallic oxide semiconductor field effect transistor ("MOSFET") that switches a current flowing from a source terminal to a drain terminal based on a voltage applied to a gate terminal.

Accordingly, the pneumatic pressure ($P_{air}$) of the microvalve 10 corresponds to a voltage applied to the gate terminal of the MOSFET, and the flow of the fluid in the microvalve 10 corresponds to a current flowing from the source terminal to the drain terminal in the MOSFET. Thus, the microvalve 10 may operate as the fluidic transistor 600.

The opening and closing of the microvalve 10 are controlled by the pneumatic pressure ($P_{air}$) and the fluidic pressure ($P_{fluid}$). Thus, the operating condition 610 of the fluidic transistor 600 when $P_{fluid}/P_{air} \leq C$ is referred to as 0 since the fluid does not flow through the closed microvalve 10 and the operating condition 610 of the fluidic transistor when $P_{fluid}/P_{air} > C$ is referred to as 1 since the fluid flows through the open microvalve 10. Here, a constant C varies based on the position of the valve seat 140 in the microvalve 10. In one embodiment, for example, when the valve seat 130 is disposed at a symmetric valve seat position, e.g., the valve seat symmetrically divides the first space of the microvalve, C is equal to 2.

As described above, the fluidic transistor 600 functions substantially similarly to MOSFET due to the operation of the microvalve 10. In addition, the microvalve 10 may also operate as a fluidic switch that performs a switching function.

FIGS. 7A to 7E show fluidic logic gates implemented by embodiments of fluidic transistors according to the present disclosure. A truth table for each of the logic gates represents the flow of the fluid based on the pneumatic pressure ($P_{air}$) and the fluidic pressure ($P_{fluid}$) by which the microvalve 10 is opened and closed. In the truth tables 713, 723, 733, 743 and 753 shown in FIGS. 7A to 7E, when $P_{fluid}/P_{air} > C$, a and b are 0, when $P_{fluid}/P_{air} \leq C$, a and b are 1, when F is 0, the fluid does not flow, and when F is 1, the fluid flows.

Figure 7A:
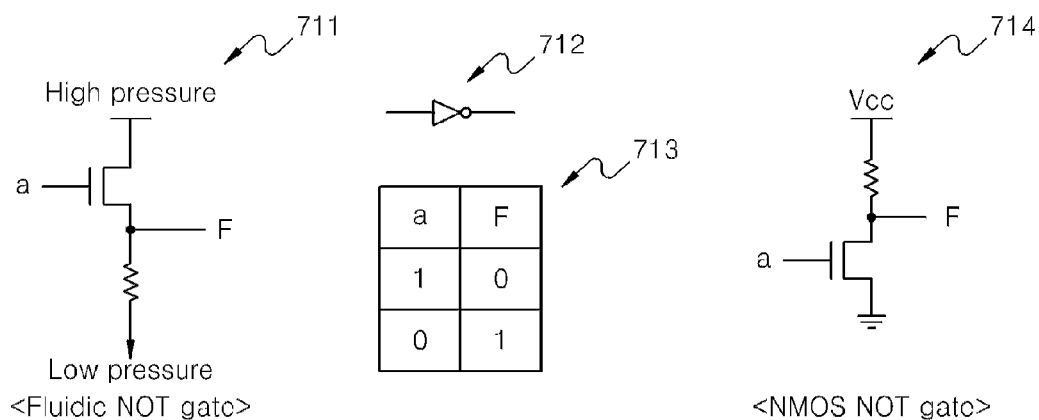
FIGS. 7A to 7E are schematic diagrams showing embodiments of fluidic logic gates implemented using fluidic transistors according to the present disclosure.

FIG. 7A illustrates a fluidic inverter (or fluidic NOT gate) 711 implemented by a fluidic transistor, a symbol 712 for the fluidic inverter 711, a truth table 713 of the fluidic inverter 711 and a NMOS NOT gate 714. The fluidic inverter 711 operates in a substantially similar manner to the NMOS NOT gate 714, and the symbol 712 and the truth table 713 thereof are also substantially similar to a symbol and a truth table for the NMOS NOT gate 714.

Figure 7B:
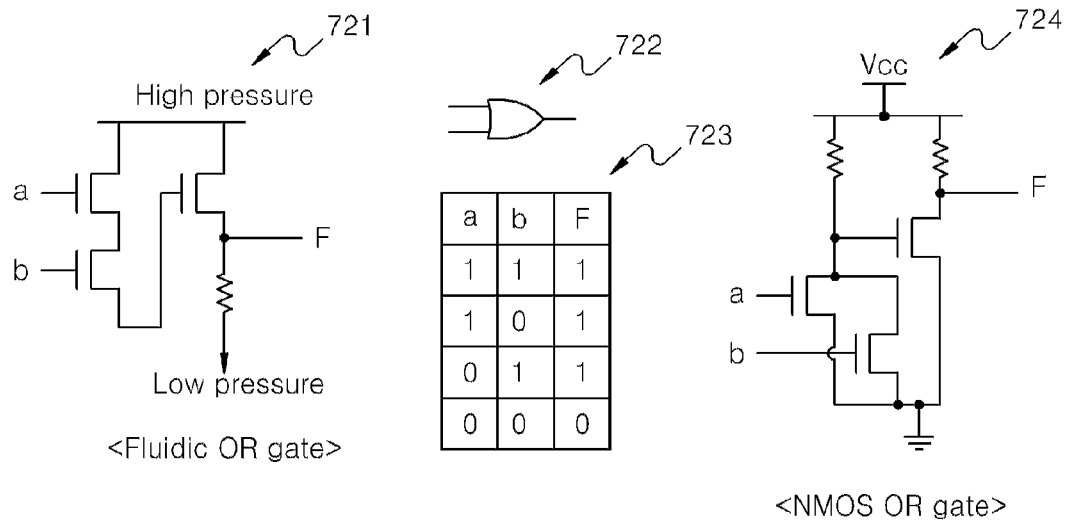

FIG. 7B illustrates a fluidic OR gate 721 implemented by a plurality of fluidic transistors, a symbol 722 for the fluidic OR gate 721, a truth table 723 of the fluidic OR gate 721 and a NMOS OR gate 724. The fluidic OR gate 721 operates in a substantially similar manner to the NMOS OR gate 724, and the symbol 722 and the truth table 723 thereof are also substantially similar to a symbol for and a truth table for the NMOS OR gate 724.

Figure 7C:
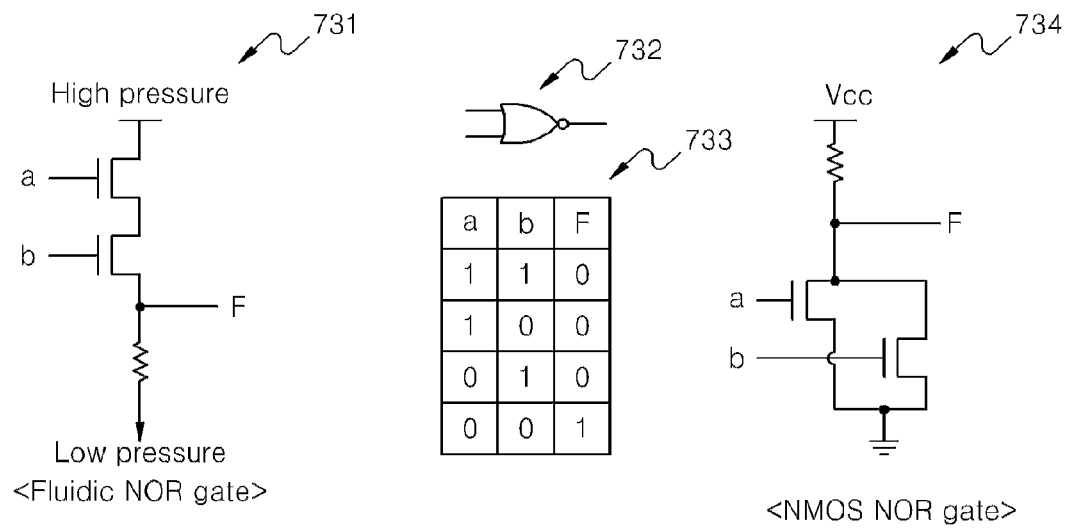

FIG. 7C illustrates a fluidic NOR gate 731 implemented by a plurality of fluidic transistors, a symbol 732 for the fluidic NOR gate 731, a truth table 733 of the fluidic NOR gate 731 and a NMOS NOR gate 734. The fluidic NOR gate 731 operates in a substantially similar manner to the NMOS NOR gate 734, and the symbol 732 and the truth table 733 thereof are also substantially similar to a symbol for and a truth table of the NMOS NOR gate 734.

Figure 7D:
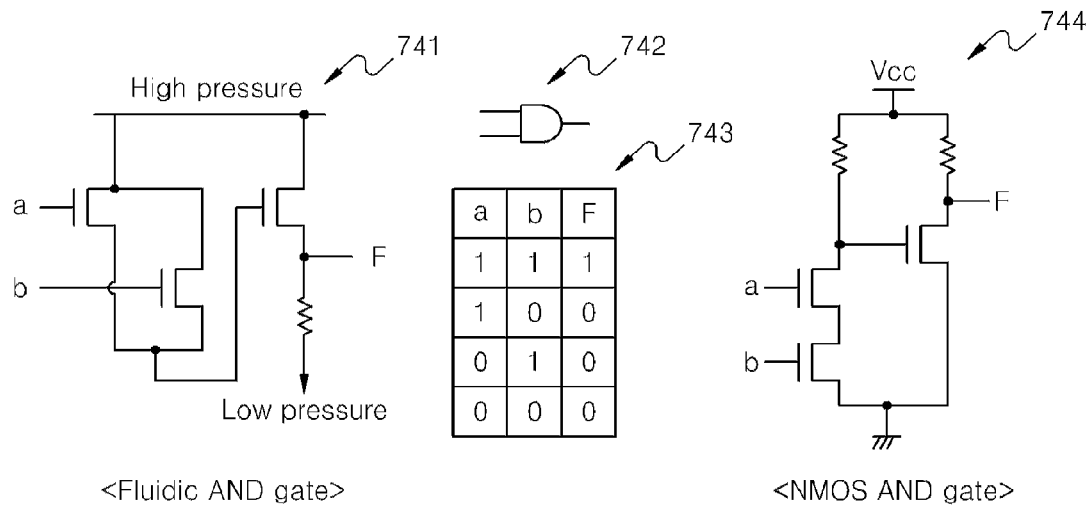

FIG. 7D illustrates a fluidic AND gate 741 implemented by a plurality of fluidic transistors, a symbol 742 for the fluidic AND gate 741, a truth table 743 of the fluidic AND gate 741 and a NMOS AND gate 744. The fluidic AND gate 741 operates in a substantially similar manner to the NMOS AND gate 744, and the symbol 742 and the truth table 743 thereof are also substantially similar to a symbol for and a truth table of the NMOS AND gate 744.

Figure 7E:
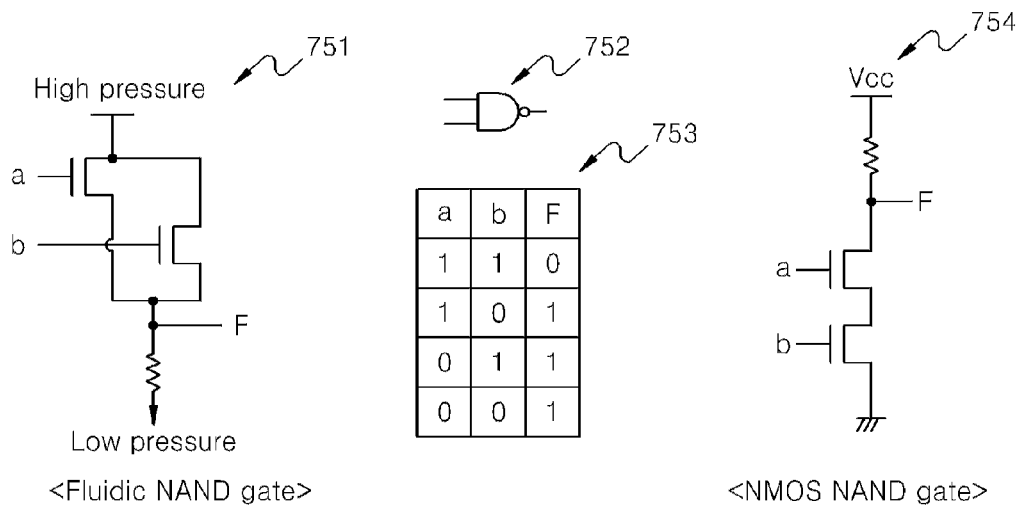

FIG. 7E illustrates a fluidic NAND gate 751 implemented by a plurality of fluidic transistors, a symbol 752 for the fluidic NAND gate 751, a truth table 753 of the fluidic NAND gate 753 and a NMOS NAND gate 754. The fluidic NAND gate 751 operates in a substantially similar manner to the NMOS NAND gate 754, and the symbol 752 and the truth table 753 thereof are also substantially similar to a symbol for and a truth table of the NMOS NAND gate 754.

It will be obvious to one of ordinary skill in the art that various fluidic logic gates, such as a fluidic XOR gate and a fluidic XNOR gate, for example, and a fluidic logic circuit such as a flip-flop circuit, for example, including the fluidic logic gates described above, may be implemented by an embodiment of the microfluidic device according to the present disclosure.

Figure 8:
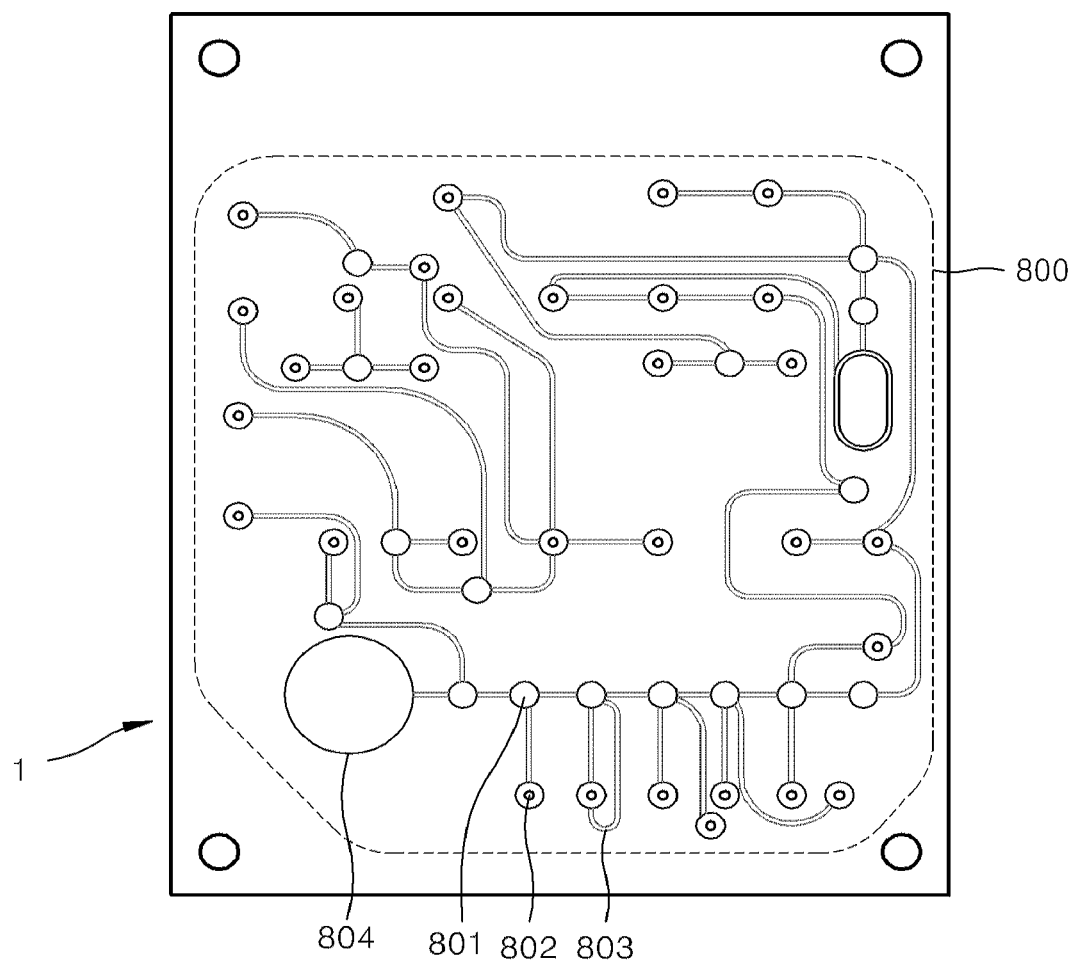
FIG. 8 is a plan view of an embodiment of a microfluidic device including a microfluidic circuit according to the present disclosure.

FIG. 8 is a plan view of a microfluidic device 1 including an embodiment of a microfluidic circuit 800 according to the present disclosure. Referring to FIG. 8, the microfluidic circuit 800 is implemented by a plurality of microvalves 801. Even though fluidic logic gates are not clearly shown in FIG. 8, the fluidic logic gates shown in FIGS. 7A to 7E may be implemented by the microvalves 801. Accordingly, the flow of fluids in the microfluidic device 1 may be logically controlled by the microfluidic circuit 800.

In one embodiment of the microvalves 801, asymmetric valve seats may be disposed at the same position in each of the microvalves 801. In an alternative embodiment, positions of at least two of the asymmetric valve seats in the microvalves may be different from each other. As described above, if the positions of the asymmetric valve seats in the microvalves 810 are different from each other, conditions for opening and closing the microvalves 801 based on the pneumatic pressure ($P_{air}$) and the fluidic pressure ($P_{fluid}$) become different. Accordingly, some microvalves 801 may be opened or other microvalves 801 may be closed under the same pneumatic pressure ($P_{air}$) and the same fluidic pressure ($P_{fluid}$). Thus, the microvalves 801 may be independently controlled.

Referring to FIG. 8, the microfluidic device 1 includes a plurality of holes 802, through which fluid or air flows in or flows out, a plurality of reaction chambers 804, in which chemical/biological reactions of the fluid occur, and a microchannel 803 that is a path, through which the fluid moves between the microvalves 801. FIG. 8 shows only one reference numeral for each of the microvalve 801, hole 802, microchannel 803 and reaction chamber 804 for convenience of description. However, a plurality of microvalves 801, a plurality of holes 802, a plurality of microchannels 803 and a plurality of reaction chambers 804 are shown in FIG. 8. FIG. 8 shows an alignment of the microvalves 801, holes 802, microchannels 803 and reaction chambers 804 in one embodiment of the microfluidic device 1. The alignment and number of the microvalves 801, holes 802, microchannels 803 and reaction chambers 804 may vary in an alternative embodiment of the microfluidic device 1.

As described above, according to the one or more of the above embodiments of the present disclosure, the conditions for opening and closing the microvalve based on the pneumatic pressure or the fluidic pressure may be changed by a position of the valve seat in the microvalve. In an embodiment, the microvalve including an asymmetrical valve seat may be closed by a pneumatic pressure less than a pneumatic pressure for closing a microvalve including a symmetrical valve seat or may be opened by a fluidic pressure less than a fluidic pressure for opening the microvalve including the symmetrical valve seat. In an embodiment, the microfluidic circuit may logically control the flow of the fluid in microchannels using logic gates implemented by a plurality of microvalves having asymmetrical valve seats that are disposed at the same position in the plurality of microvalve or different positions in the plurality of microvalves.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A microfluidic device comprising:
    at least one microvalve which controls a flow of a fluid, wherein the at least one microvalve comprises:
    a pneumatic layer;
    a fluidic layer disposed opposite to the pneumatic layer;
    an elastomer membrane disposed between the pneumatic layer and the fluidic layer, wherein the elastomer membrane is deformed by a pressure applied thereto; and
    an asymmetric valve seat protruding from a surface of the fluidic layer toward a surface of the elastomer membrane and asymmetrically dividing a first space between the fluidic layer and the elastomer membrane.

2. The microfluidic device of claim 1, wherein conditions for opening and closing the at least one microvalve vary according to a position of the asymmetric valve seat in the first space thereof.

3. The microfluidic device of claim 1, wherein the asymmetric valve seat is disposed closer to a fluid inlet, through which the fluid flows into the first space, than a fluid outlet, through which the fluid flows out of the first space.

4. The microfluidic device of claim 1, wherein the asymmetric valve seat is disposed closer to a fluid outlet, through which the fluid flows out of the first space, than a fluid inlet, through which the fluid flows into the first space.

5. The microfluidic device of claim 1, further comprising:
    a plurality of microvalves including a first microvalve and a second microvalve,
    wherein a position of the asymmetric valve seat in the first microvalve is different from a position of the asymmetric valve seat in the second microvalve.

6. The microfluidic device of claim 5, wherein the plurality of microvalves defines a microfluidic circuit.

7. The microfluidic device of claim 1, wherein the at least one microvalve operates as a fluidic transistor which switches the flow of the fluid in the first space based on a pneumatic pressure in a second space between the pneumatic layer and the elastomer membrane.

8. The microfluidic device of claim 7, wherein the at least one microvalve operates as a fluidic switch.

9. The microfluidic device of claim 7, wherein the at least one microvalve operates as a fluidic inverter.

10. The microfluidic device of claim 7, further comprising:
    a plurality of microvalves which operates as fluidic transistors,
    wherein the plurality of microvalves operate as a fluidic OR gate performing a function of an OR gate.

11. The microfluidic device of claim 7, further comprising:
    a plurality of microvalves which operates as fluidic transistors,
    wherein the plurality of microvalves operate as a fluidic NOR gate performing a function of a NOR gate.

12. The microfluidic device of claim 7, further comprising:
    a plurality of microvalves which operates as fluidic transistors,
    wherein the plurality of microvalves operate as a fluidic AND gate performing a function of an AND gate.

13. The microfluidic device of claim 7, further comprising:
    a plurality of microvalves which operates as fluidic transistors,
    wherein the plurality of microvalves operate as a fluidic NAND gate performing a function of a NAND gate.

14. The microfluidic device of claim 7, further comprising:
    a plurality of microvalves which operates as fluidic transistors,
    wherein the plurality of microvalves operate as a fluidic XOR gate performing a function of a XOR gate.

15. The microfluidic device of claim 7, further comprising:
    a plurality of microvalves which operates as fluidic transistor,
    wherein the plurality of microvalves operate as a fluidic XNOR gate performing a function of a XNOR gate.

16. The microfluidic device of claim 7, further comprising:
    a plurality of microvalves which operate as fluidic transistors,
    wherein the plurality of microvalves operate as a fluidic flip-flop performing a function of a flip-flop.

17. A microfluidic device comprising:
    at least one microvalve which controls a flow of a fluid, wherein the at least one microvalve comprises:

a fluidic layer which defines a first path, through which the fluid flows;

a pneumatic layer disposed opposite to the fluidic layer and which defines a second path, through which gas flows;

an asymmetric valve seat protruding from a surface of the fluidic layer;

an elastomer membrane which is disposed between the fluidic layer and the pneumatic layer and deformed by a pressure to substantially contact or to be spaced apart from the asymmetric valve seat, and thus controls the flow of the fluid; and a first space which is formed between the fluidic layer and the elastomer membrane, wherein the first space is asymmetrically divided by the asymmetric valve seat.

18. The microfluidic device of claim 17, wherein conditions for opening and closing the at least one microvalve vary according to the position of the asymmetric valve seat.

19. The microfluidic device of claim 17, wherein the asymmetric valve seat is disposed closer to a fluid inlet, through which the fluid flows into the first space, than a fluid outlet, through which the fluid flows out of the first space.

20. The microfluidic device of claim 17, wherein the asymmetric valve seat is disposed closer to a fluid outlet, through which the fluid flows out of the first space than a fluid inlet, through which the fluid flows into the first space.

21. The microfluidic device of claim 17, further comprising:

a plurality of microvalves including a first microvalve and a second microvalve, wherein a position of the asymmetric valve seat in the first microvalve is different from a position of the asymmetric valve seat in the second microvalve.

22. The microfluidic device of claim 17, wherein the at least one microvalve operates as a fluidic transistor which switches the flow of the fluid in the first space based on a pneumatic pressure in a second space between the pneumatic layer and the elastomer membrane.

23. The microfluidic device of claim 22, wherein the at least one microvalve operates as a fluidic switch which performs a switching function.

24. The microfluidic device of claim 22, wherein the at least one microvalve operates as a fluidic inverter.

25. The microfluidic device of claim 22, further comprising:

a plurality of microvalves which operates as fluidic transistors, wherein the plurality of microvalves operate as a fluidic OR gate performing a function of an OR gate.

26. The microfluidic device of claim 22, further comprising:

a plurality of microvalves which operates as fluidic transistors, wherein the plurality of microvalves operate as a fluidic NOR gate performing a function of a NOR gate.

27. The microfluidic device of claim 22, further comprising:

a plurality of microvalves which operates as fluidic transistors, wherein the plurality of microvalves operate as a fluidic AND gate performing a function of an AND gate.

28. The microfluidic device of claim 22, further comprising:

a plurality of microvalves which operates as fluidic transistors, wherein the plurality of microvalves operate as a fluidic NAND gate performing a function of a NAND gate.

29. The microfluidic device of claim 22, further comprising:

a plurality of microvalves which operates as fluidic transistors, wherein the plurality of microvalves operate as a fluidic XOR gate performing a function of a XOR gate.

30. The microfluidic device of claim 22, further comprising:

a plurality of microvalves which operates as fluidic transistors, wherein the plurality of microvalves operate as a fluidic XNOR gate performing a function of a XNOR gate.

31. The microfluidic device of claim 22, further comprising:

a plurality of microvalves which operates as fluidic transistors, wherein the plurality of microvalves operate as a fluidic flip-flop performing a function of a flip-flop.

* * * * *